United States Patent [19]

Resch et al.

[11] Patent Number: 5,404,085

[45] Date of Patent: Apr. 4, 1995

[54] MULTIFUNCTION AIRCRAFT WINDSCREEN WIPER CONTROL SYSTEM

[75] Inventors: William Resch, Brooklyn Park; Roger R. Benson, Eden Prairie, both of Minn.

[73] Assignee: Rosemount Aerospace, Inc., Akron, Ohio

[21] Appl. No.: 910,910

[22] Filed: Jul. 10, 1992

[51] Int. Cl.6 .............................................. B60S 1/08
[52] U.S. Cl. ........................... 318/443; 318/DIG. 2; 318/466
[58] Field of Search ............... 318/443, 444, 480, 483, 318/DIG. 2, 466

[56] References Cited

U.S. PATENT DOCUMENTS

| | | | |
|---|---|---|---|
| 4,320,329 | 3/1982 | Gille et al. | 318/443 |
| 4,419,611 | 12/1983 | Kawasaki et al. | 318/443 |
| 4,455,511 | 6/1984 | Stewart, Sr. | 318/9 |
| 4,492,904 | 1/1985 | Graham | 318/444 |
| 4,705,998 | 10/1987 | Millerd et al. | 318/444 |
| 4,825,134 | 4/1989 | Tracht | 318/443 |
| 4,859,919 | 8/1989 | Tracht | 318/444 |
| 4,866,357 | 9/1989 | Miller et al. | 318/443 |
| 4,885,512 | 12/1989 | Gille et al. | 318/444 |
| 4,900,996 | 2/1990 | Wainwright | 318/443 |
| 4,947,092 | 8/1990 | Nabha et al. | 318/444 |
| 5,059,877 | 10/1991 | Teder | 318/480 |
| 5,239,244 | 8/1993 | Teder | 318/483 |

Primary Examiner—William M. Shoop, Jr.
Assistant Examiner—John W. Cabeca
Attorney, Agent, or Firm—Nicholas E. Westman; Richard A. Romanchik

[57] ABSTRACT

A wiper control system which includes dual wiper control circuits operating from a single rotary control switch, which is mounted in a cockpit of an aircraft remote from the rest of the wipers and system components which are mounted near an aircraft windscreen in a housing from which a motor converter drive shaft protrudes generally normal to a portion of the airframe surface. The drive shaft is connected to one end of a wiper arm and the second end of the wiper arm is rotatably attached to the wiper blade. The dual wiper control circuits are electrically isolated from each other. The rotary switch includes dual voltage dividers and a single axial rotating member to create an analog voltage output signal representative of the control switch position which is interpreted by a controller circuit. The rotary switch speed selections include a HIGH speed, a LOW speed, an INTERMITTENT delay selection, and also a selection for PARK and OFF. The control circuit provides a digital signal input to a logic circuit which determines the rotary switch position and produces a digital output signal to an amplifier circuit that drives the windscreen wiper motor, which in turn drives the wiper arm at the selected speed. A function decoder and commutation logic device prevents motor overheating and power amplifier overheating.

12 Claims, 6 Drawing Sheets

MULTIFUNCTION AIRCRAFT WINDSCREEN WIPER CONTROL SYSTEM

BACKGROUND OF THE INVENTION

The present invention relates to an improved windscreen wiper control system for use on aircraft, Aircraft control systems are designed to maximize system performance and minimize system weight in order to expand airframe performance. This design goal is served when existing aircraft systems are replaced with lighter, safer and more advanced systems. Safety is an emphasis in design of all aircraft control systems and weight savings immediately translate to improved aircraft performance and increased load capacity. When both of these design goals are realized an improved overall aircraft will result.

Accordingly, the wiper control system of the instant invention utilizes a lightweight multifunction rotary control switch for controlling dual windscreen wiper circuits, one each for a pilot and a copilot. The present wiper control system employs analog to digital signal conversion, erasable programmable logic circuits, a conventional motor controller integrated circuit, a power amplifier having remote over current protection, a non-mechanical wiper blade PARK switch circuit, and a brushless electric motor having remote over temperature protection. Neither the parking circuit nor the brushless motor produces electrical arcing and thus are safer than prior art circuits. Furthermore, the present wiper control system is robust, lightweight and relatively quiet in operation and is compatible with existing wiper control mounting spaces and wiper control system wiring harnesses on select commercial aircraft.

SUMMARY OF THE INVENTION

The wiper control system of the present invention comprises dual wiper control circuits operating from a single rotary control switch. The rotary switch is mounted in the cockpit of an aircraft remote from the rest of the wiper system components which are mounted proximate the aircraft windscreen. The wiper control system components are mounted in an aluminum housing from which a motor converter drive shaft protrudes generally normal to a portion of the airframe surface near the windscreen. The drive shaft is connected to one end of a wiper arm and the second end of the wiper arm is rotatably attached to the wiper blade.

Each of the dual wiper control circuits is identical, but is electrically isolated from the other. The rotary switch comprises dual first voltage dividers, a single axial function select member creates an analog voltage output signal representative of the control switch position when electrical contact is established between the axial function select member and the voltage dividers.

The analog voltage output signal is processed by a controller circuit including logic means. The rotary switch speed selection positions are HIGH, LOW and INTERMITTENT (seven second delay). The rotary switch also has a selection position for PARK and OFF.

A remote magnetic PARK position sensor provides an accurate wiper position input for on-windscreen Parking of the wiper arm and blade when PARK is selected.

Each wiper control circuit uses a second voltage divider and an A/D converter that provides the digital signal input to a logic circuit for determining the rotary control switch position. The logic circuit produces a digital output signal to an amplifier circuit that delivers the appropriate driving signal to a windscreen wiper motor to drive the wiper arm at the selected speed. The digital output has five valid control switch codes as shown in Table 1 below. The digital output from the second voltage divider and the D/A converter is input to an erasable programmable logic device (EPLD) which decodes the control switch position and provides an output. The EPLD output is input to a function decoder and commutation logic device which provides an output to an electrical motor driver and power amplifier circuit. Thus, the motor driver generates a synchronized current signal through the coils of a brushless electric motor causing the driven part of the brushless motor to rotate at the desired speed thereby driving the wiper arm between an inner position and an outer position across the windscreen. Furthermore, the function decoder and commutation logic device receive inputs from a remote wiper arm PARK switch, a current sensing element attached to the power amplifier, a temperature sensor attached to the brushless electric motor, an analog timer circuit, a motor tachometer resident on the EPLD, and a motor rotor position decoder that is resident on the function decoder and commutation logic device. Thus, the function decoder and commutation logic device prevent motor and power amplifier overheating, thereby avoiding damage to these control system components.

DESCRIPTION OF THE PREFERRED EMBODIMENTS

Figure 1:
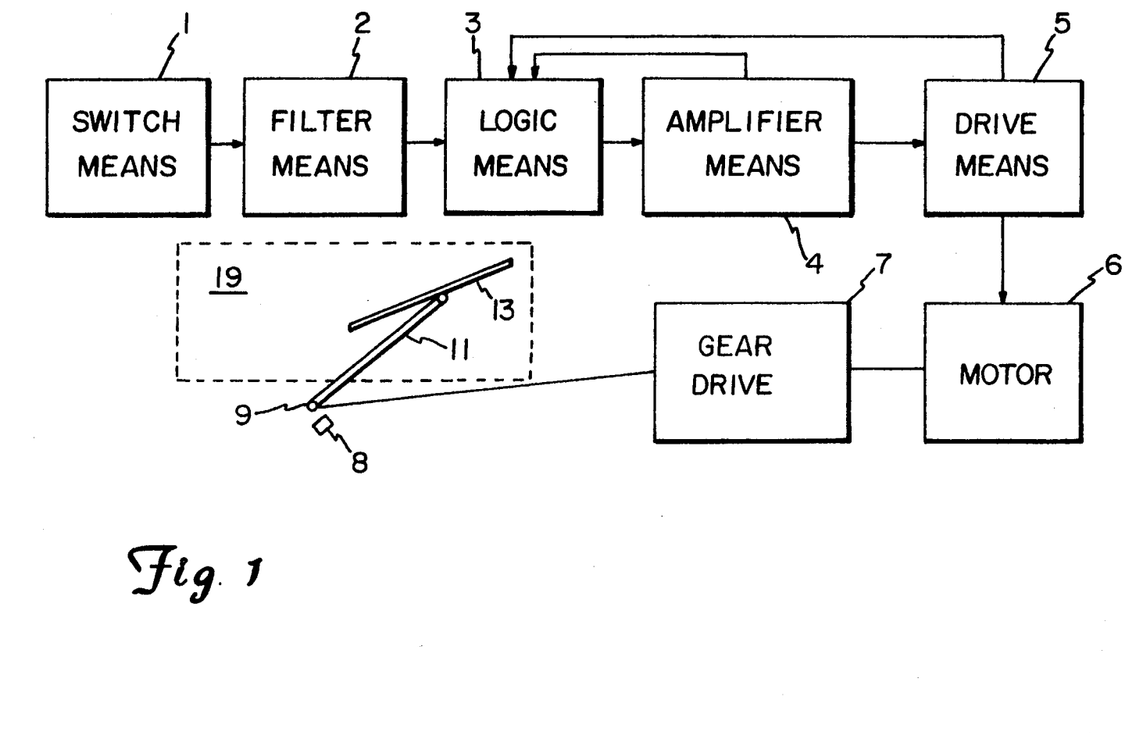
FIG. 1 is a block diagram illustrating the relationship of functional modules of the aircraft wiper control system of the present invention.

The wiper control system of the present invention includes switch means 1 for choosing a wiper function, filter means 2 for reducing electrical interference, logic means 3 for interpreting the switch means output, amplifier means 4 for powering a wiper motor and at least one drive means 5 for driving an electric wiper motor 6, a gear drive 7 for converting the electric motor rotary motion to oscillating side-to-side motion and propelling a wiper arm 11 and wiper blade 13 across a windscreen 19 as shown in FIG. 1.

Figure 2:
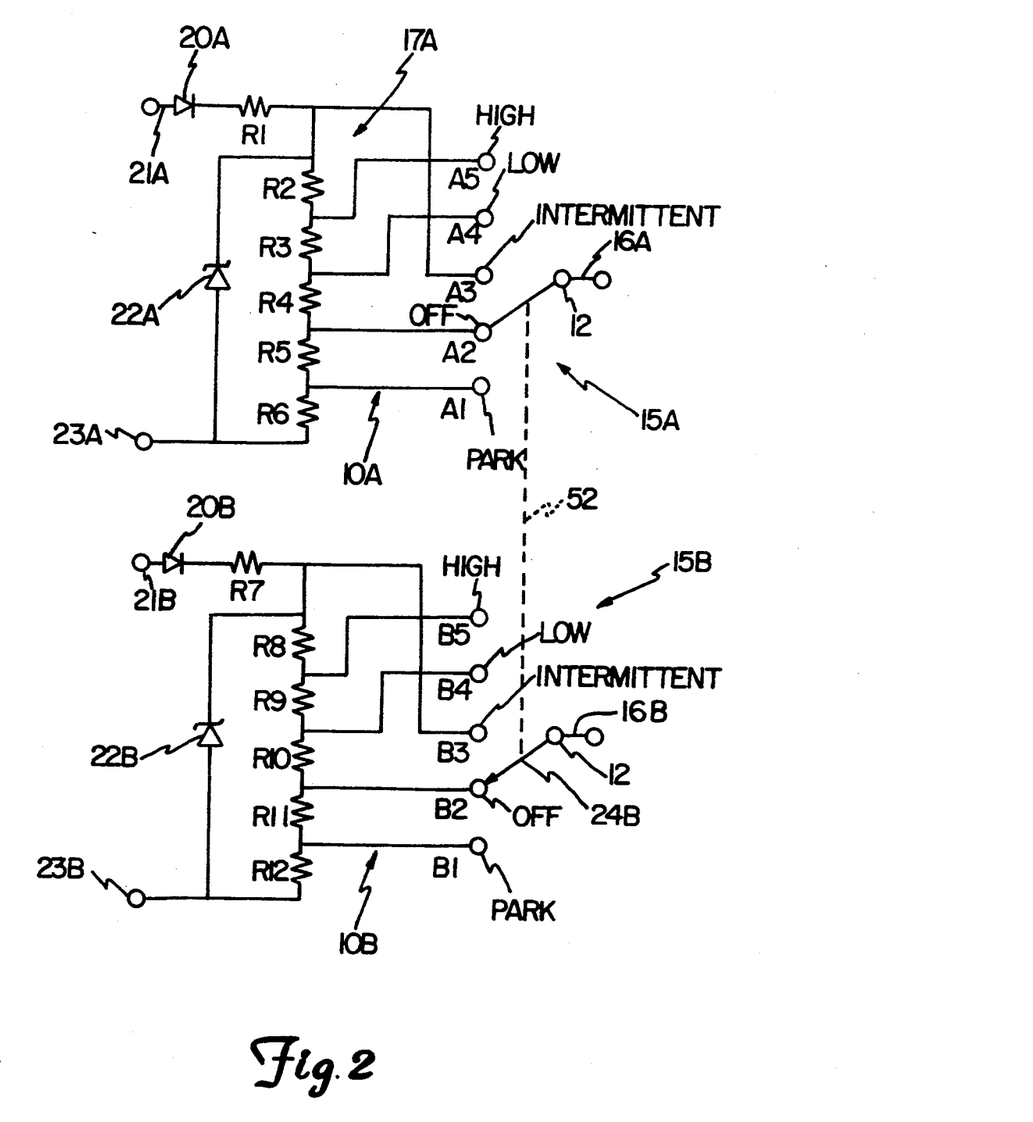
FIG. 2 is an electrical schematic of one of the dual control switch circuits of the wiper control system rotary switch.

FIG. 2 is an electrical schematic of the switch means 1 of the preferred embodiment of the present invention. The switch means has two mutually insulated rotary control switch circuits 10A and 10B to supply the control voltage outputs to both the pilot and copilot wiper systems, respectively. The rotary control switch circuit 10A and 10B of the preferred embodiment include three wire rotary switches 15A and 15B for generating an output signal indicative of the position of the rotary switch. The rotary control switches 15A and 15B have a common axial rotating member 12 with a selection arm 24A for establishing electrical contact with a first voltage divider 17A. The preferred embodiment offers five possible wiper function selections, the corresponding electrical contacts are noted in FIG. 2 as electrical leads: A1 (PARK), A2 (OFF), A3 (INTERMITTENT), A4 (LOW) and A5 (HIGH) speed. The PARK selection is momentarily detent before returning to OFF.

Figure 3:
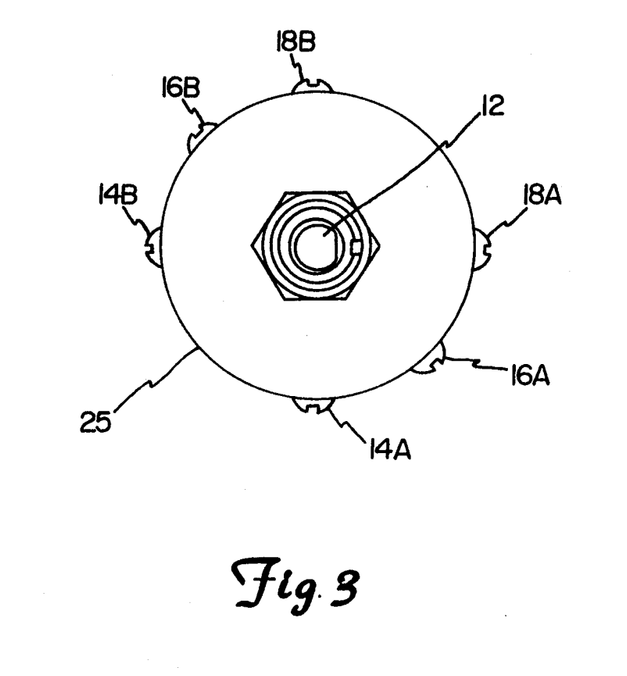
FIG. 3 is an end view of a switch assembly used in the present invention.
Figure 4:
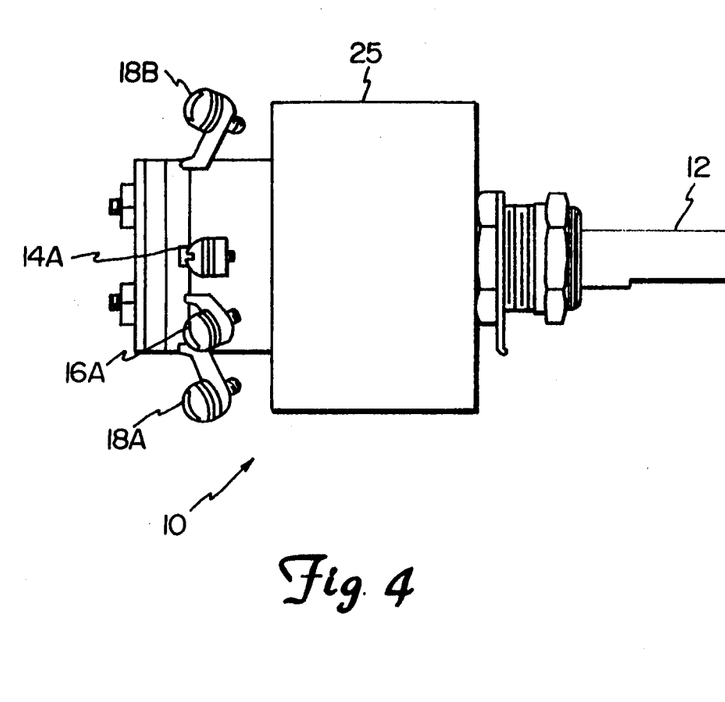
FIG. 4 is a side elevational view of the switch assembly of FIG. 3.

FIG. 2 and FIG. 3 illustrate a single rotary control switch of the present invention, showing a housing 25 partially surrounding the dual control switch circuits 10A and 10B.

Referring now to subcircuit 10A of FIG. 2, the three wires 14A, 16A, and 18A of the switch circuit 10A are the selection wire 16A, voltage input wire 14A and voltage return wire 18A. The selection wire 16A is connected to the axial rotating member 12 for providing independent electrical contact with a portion of the first voltage divider 17A of the control switch circuit 10A.

The control switch circuit 10A also includes of a diode 20A connected to the voltage input wire 14A at one end and a first resistor R1 at a second end. The diode 20A prevents reverse voltage application to the wiper control circuit. The second end of diode 20A is also connected to a node of the voltage divider circuit 17A consisting of six resistors R1-R6 respectively. The second end of resistor R1 is also connected to an electrical lead A3 associated with the INTERMITTENT wiper function selection and further connected to a first end of a 24 volt zener diode 22A. Zener diode 22A is further connected in parallel to the voltage divider 17A at a first end of resistor R2 and a second end of resistor R6.

The voltage divider 17A consists of equal value resistance elements and five electrical contacts A1–A5 connected between adjacent resistance element R1-R6 of the voltage divider 17A respectively. When the axial rotating member 12 is rotated, a function selection arm 24A sequentially establishes electrical contact with each of the electrical contacts A1–A5. Thus, when the axial rotating member 12 is rotated, the function selection arm 24A makes electrical contact with one of the electrical contacts A1–A5 associated with the voltage divider 17A and functions as a voltage tap. The voltage present on the selection wire 16A thereby provides an output representative of the electrical potential present at the point of electrical contact. Thus, the position of the selection arm 24A of axial rotating member 12 can be accurately interpreted by measuring the electrical potential present on the selection wire 16A. The output signal of the rotary control switch circuit 10A is thus a function of the wiper function selection.

The switch means incorporates a 24 V zener diode 22A for clamping the control voltage to safe levels, especially during aircraft electrical surge or transient voltage spike. Diode 20A protects for reverse polarity voltage being connected to the switch power terminals 21A, 23A. This diode protection prevents a negative output control voltage being sent back to the wiper system electronics, thus preventing adverse effects.

The characteristic electrical potentials provided by the selection wire 16A are illustrated in the Table 1 below with an input voltage of 28 volts direct current. As function selection arm 24A is sequentially coupled to electrical leads A1–A5 the voltage divider 17A produces increases in electrical potential in a step-wise manner. The electrical contact associated with the INTERMITTENT wiper function selection is located at electrical lead A3 for consistency with existing wiper switch configurations and the voltage level of the INTERMITTENT function is simply a result of the voltage dropping series resistor R1 along with minimal electrical effect of diode 20A.

TABLE 1

| ROTATING MEMBER 12 OUTPUT | |
|---|---|
| POSITION | V = 28 VDC |
| A1 (PARK) | 4.5 |
| A2 (OFF) | 9.0 |
| A3 (INT.) | 22.9 |
| A4 (LOW) | 13.5 |
| A5 (HIGH) | 18.0 |

Figure 5:
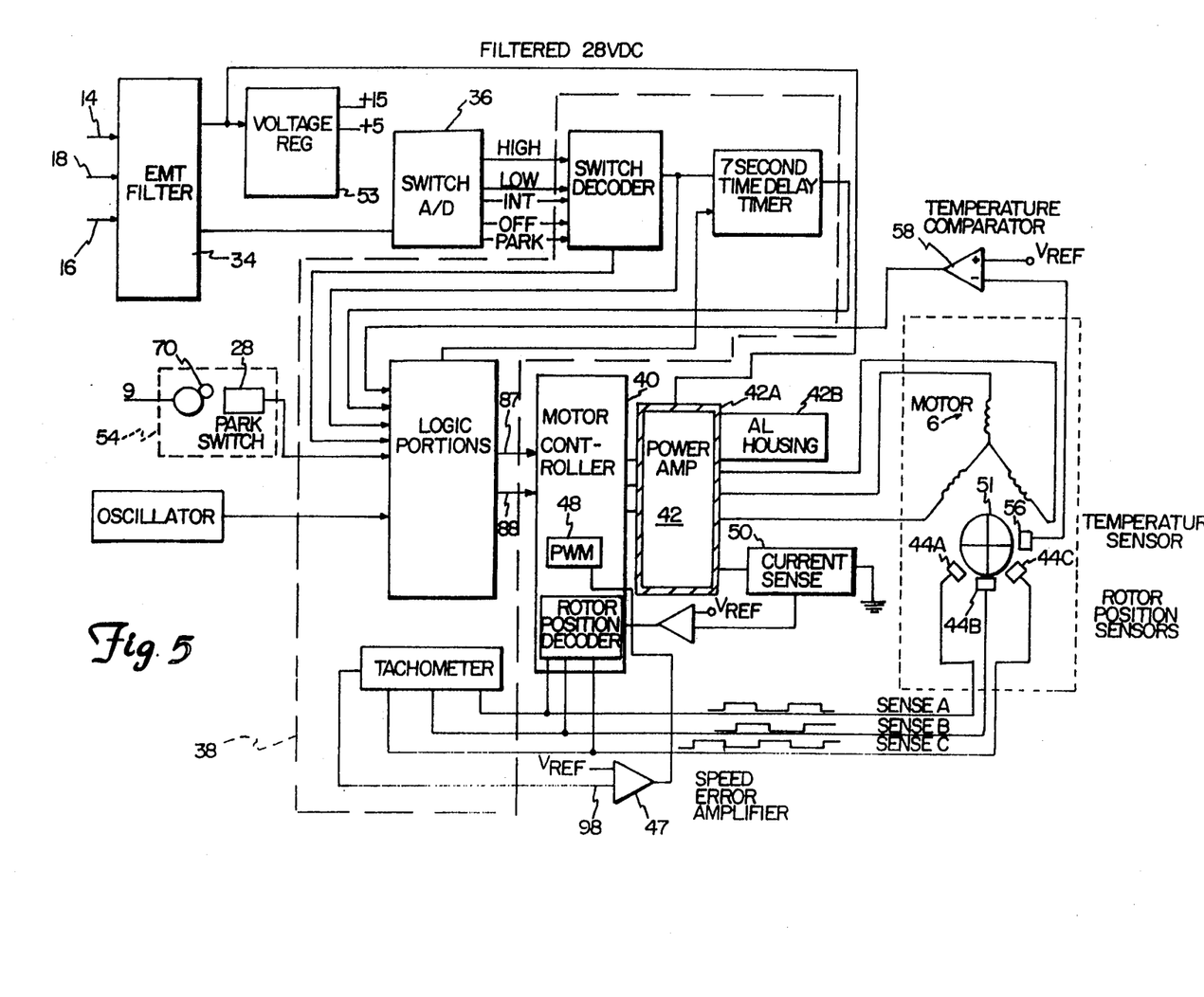
FIG. 5 is a block diagram representation of the wiper control system of the present invention.

TABLE 1
Referring to FIG. 5, wires 14, 16, and 18 of the switch are then filtered by an electromagnetic interference (EMI) filter 34 to eliminate extraneous interference from the switch output.

The aircraft operating environment includes interference-introducing events such as lightning strikes, turbulence, and airframe stress as well as the collective electrical interference of the flight control systems, flight propulsion systems, and other electronics on the aircraft. Therefore, EMI filter 34 of the present invention is configured to suppress EMI present in the 28 volt direct current signal on input wire 14 as well as the return wire 18 and selection wire 16.

The selection wire 16 output from the EMI filter 34 is then conducted to a switch analog to digital (A/D) converter 36. The switch A/D converter 36 of the preferred embodiment is a converter that outputs a digital signal on a selected one of its output lines as a function of the input voltage level. In one form the A/D converter 36 can use an array of voltage comparators for measuring the electrical potential present on selection wire 16 after EMI filtering. The output on the appropriate line from the A/D converter 36 which indicates the position of selection arm 24 as labelled in FIG. 5 is the input to an erasable programmable logic device (EPLD) 38 which is programmed to accept the comparator voltage output and provide a logic signal output to a motor controller 40. The outputs of the A/D converter 36 are digital (i.e. high signal=5 volts, low signal=0 volts) to be interpreted by the EPLD 38. The EPLD monitors and decodes the digital outputs to perform the different modes of operation selected by the switch position. Any invalid digital output will not be decoded. The following is a Truth Table for the A/D connector 36 which are valid outputs to the EPLD 38.

| MSB B4 | B3 | B2 | B1 | LSB B0 | FUNCTION (ACTIVE HIGH) |
|---|---|---|---|---|---|
| 0 | 0 | 0 | 0 | 1 | PARK |
| 0 | 0 | 0 | 1 | 1 | OFF |
| 0 | 0 | 1 | 1 | 1 | LOW |
| 0 | 1 | 1 | 1 | 1 | HIGH |
| 1 | 1 | 1 | 1 | 1 | INTERMITTENT |

TRUTH TABLE FOR EPLD where a digital 0=0 volts, and a digital 1=5 volts
MSB=most significant bit LSB=least significant bit
B4–B0 are the five bits to the EPLD The EPLD 38 of the preferred embodiment is an Altera Corporation Multiple Array Matrix EPM5032 but other similar programmable logic devices will suffice for the effective implementation of the present invention.

EMI FILTER CIRCUIT 34

An EMI filter 34 is provided to ensure compliance with various commercial and military electrical signal interference specifications.

MOTOR CONTROLLER ELECTRONICS 40

The main control electronics of the brushless motor 6 and an array of voltage comparators, not shown, are used to decode control switch 10A output voltage on selection wire 16A and generate a digital output for the Erasable Programmable Logic Device (EPLD) 38. The EPLD 38 thus determines the windscreen wiper function that has been selected. The EPLD 38 sends the proper control signals (e.g. both active high) to the brushless motor DC controller integrated circuit 40, which is Motorola part number MC33035 in the preferred embodiment of the present invention.

A motor controller input is generated from three Hall Effect sensors 44A, 44B and 44C located on the brushless motor 6, a preferred component of the present invention, that drives a gear drive 7 which propels a wiper arm 11 and wiper blade 13 in a predetermined cyclical radius to clear the windscreen. The three Hall Effect sensors 44A, 44B and 44C signal the position of a brushless motor 6 rotor, not shown. The Hall Effect sensor signals are represented by SENSE-A, SENSE-B and SENSE-C. With the rotation of the brushless motor 6, these three sensor signals, which appear as pulses, are used internally within the motor controller 40 for position decoding for proper commutation sequencing. The three sensor signals are valid only if at least one signal is high and at least one signal is low at all times. Output buffers, in the motor controller 40 drive the power amplifier 42.

Figure 6:
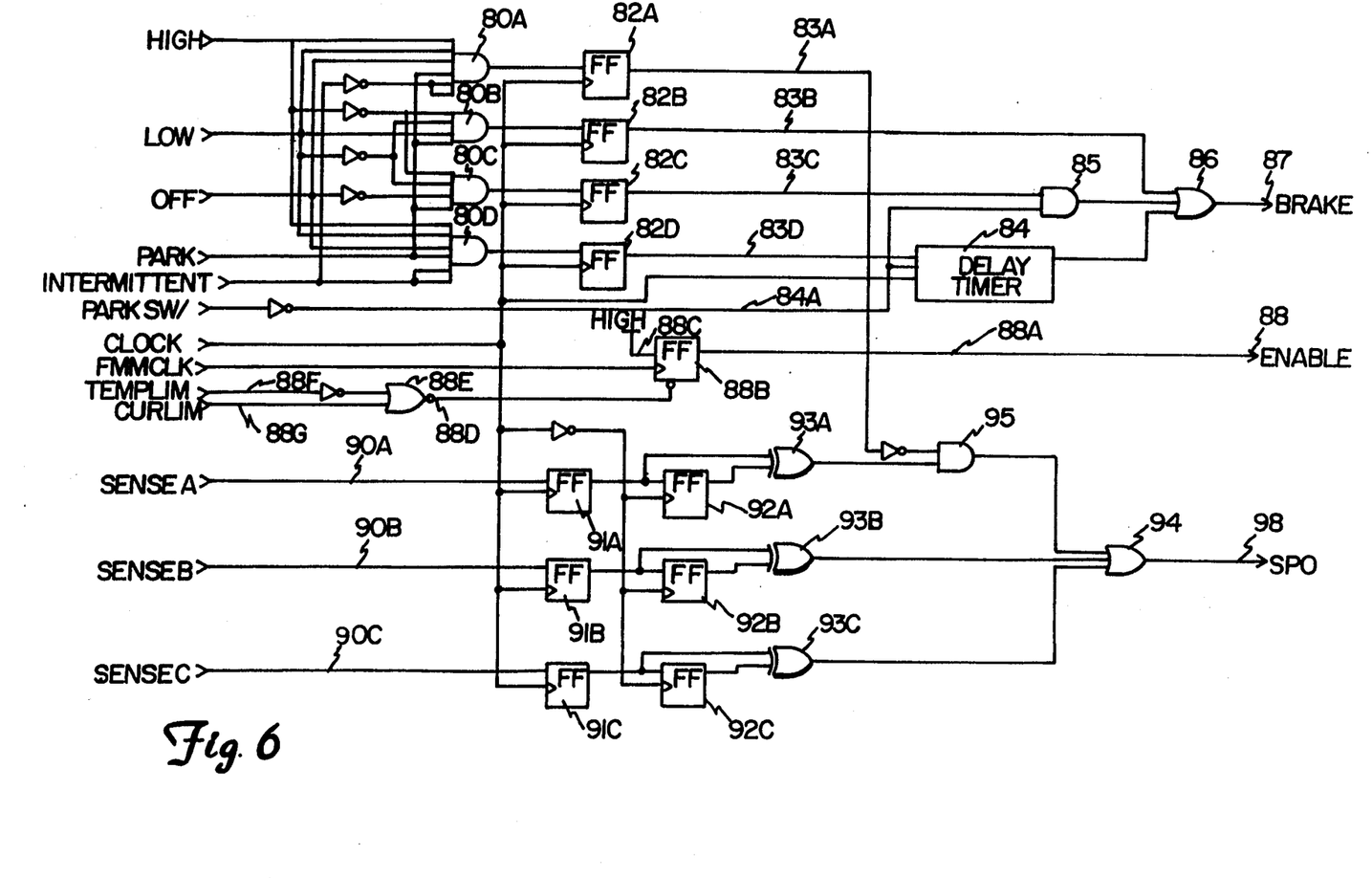
FIG. 6 is a detailed schematic representation of the erasable programmable logic device shown in FIG. 5.

For speed control, the gall Effect sensor pulses are converted to a pulse train of narrow pulses (SPD) on the rising and falling edge of each sensor signal by the EPLD 38. The average voltage of the narrow pulses is calculated by an R-C circuit of conventional design. The average voltage is amplified with a differential amplifier 47 and fed to the motor controller 40, where an internal pulse width modulation (PWM) circuit 48 can accurately control the speed regulation in both LOW and HIGH speed conditions. In HIGH speed, the EPLD 38 "gates" out one of the pulses (one of the three is blocked, as shown in FIG. 6) forcing the motor controller 40 to rotate the brushless motor 6 faster to maintain the average voltage to the differential amplifier 47 thus allowing LOW speed to be ⅔ the RPM or (strokes per minute) of HIGH speed. Over current protection for the power amplifier is accomplished by using a standard current sense circuit 50. The over current signal is provided as an input to the EPLD (see FIG. 6) which will disable the drive to the power amplifier 42 and the brushless motor 6 will coast for a short period of time. The rapid enable/disable of the brushless motor 6 is set up by the PWM frequency (18K to 20 KHz). The peak current must be large enough to allow sizeable torques to be developed for worst case condition of start up on dry glass center windshield with in-flight aerodynamic loading, or frozen or stalled wiper blade on windscreen. The preferred peak current has been determined to be approximately 25 amps.

In the event of a locked brushless motor 6 rotor member 51 additional brushless motor 6 protection may be provided by current averaging circuit. If a large current is present, for example as a result of a locked brushless motor 6 rotor member, the current averaging circuit will switch in a lower reference voltage that will drive the power amplifier 42 at approximately 9.5 to 10 amps after a delay of approximately four seconds, thus preserving the brushless motor 6.

When the wiper system is in the OFF or momentary PARK mode, the BRAKE signal goes high, and the brushless motor rapidly decelerates.

An output from motor controller 40 is conducted to a power amplifier means circuit 42 where the required electrical power is generated to drive the wiper arm 11 and wiper blade 13 as selected by rotary switch 10A.

Referring to FIG. 6, a more detailed layout of the switch decoder and certain logic functions carried on with the EPM5032 is illustrated. The input lines are labeled, as they are in FIG. 3, and the signals on each of the lines will be provided to a series of AND gates indicated generally at 80, which provide output signals depending upon the input signal. The AND gates in turn provide signals to flip-flops 82A–82D that can be set. Flip-flops 82A–82D will, when respectively selected by the corresponding AND gate, provide a high signal. For example, a high output is on line 83A when "HIGH" is selected; a high output is on line 83B when the "OFF" signal is selected; a high output is on line 83C when the "PARK" position is selected; and a high output is on line 83D when the "INTERMITTENT" position is selected.

The high output on line 83D goes into the seven second delay timer 84, which receives a further input along the line 84A when the PARK position switch is activated. This signal on line 84A, together with the line 83C, is passed through an AND gate 85 and, as can be seen, an OR gate 86 is used for providing an output to a brake output terminal 87 which will cause braking of the brushless motor. Brakes will be energized when the off signal on line 83B is high, or when the signal from the output of AND gate 85 is high, or when the signal from the timer 84 is high. This timer, of course, provides a seven second delay for the high signal, after which the signal would go low.

A signal on 88A provides an output to a motor enable terminal 88 that causes the motor to run when the signal is high and causes the motor to coast whenever the signal is low. The signals on terminals 87 and 88 are separate, so that the motor is driven or permitted to coast by the signal on terminal 88, while it is braked by the signal on terminal 87. The signal on line 88A is provided from a flip-flop 88B which is permitted to pass a high signal from line 88C when clocked by PMWCLK only when the output on the line 88D from a NOR gate 88E provides the proper state to enable flip-flop 88B. NOR gate 88E will provide the proper state when the signal from a temperature sensor on line 88F and the signal from the current limiter on line 88G indicate that the temperature is below the preselected temperature and the current has not gone high.

The inputs from Hall Effect sensors 44A, 44B and 44C are along lines 90A, 90B, and 90C, and these are passed through suitable flip-flops indicated at 91A, 91B and 91C, to provide pulses synchronized by clock signal along the clock line. The flip-flop outputs from flip-flops 91A, 91B, and 91C are thus timed and go through second flip-flops 92A, 92B, and 92C and exclusive OR gates 93A, 93B, and 93C to an OR gate 94. The output from exclusive OR gate 93A is connected to an AND gate 95, which receives an input from the signal on line 93A and an inversion of the signal on line 83A so that when HIGH is selected, the pulse from 93A will not be passed through the OR gate 94 to the output tachometer line or motor drive line 98 which is a series of pulses that pass to the motor controller 40. The series of pulses on line 98 is the tachometer output.

The present invention includes two clock signals. The first clock signal (CLOCK) is generated by a standard 555 timer, with a frequency of approximately 1.5 KHz. The first clock signal is used for latching the decoded control switch signal in the EPLD 38, and for timing the seven second intermittent timer 84 and also controls the pulse width duration of the SENSE A-C signal used in the tachometer circuit, which is shown schematically. The second clock (PWMCLK) is generated independently and is synchronized with the PWM frequency in the motor controller and clocks in the active high signal, CURLIM (line 88G) or active low signal TEMPLIM (line 88F) to disable the motor controller 40 through line 88A and power amplifier 42 when over current or a preselected maximum motor temperature is exceeded. If neither the current limit or temperature limit signals are present, the power amplifier 42 is enabled to operate. The EPLD 38 is powered from a 5 volt linear regulator 53, that is Stepped down from the filtered input aircraft voltage of 28 volts.

Referring to FIG. 2 unique pilot and copilot system configuration is performed with an electric "jumper" connection 52 between the circuits. With the jumper connection 52 in the wiper control circuit 10, the brushless motor 6 rotates clockwise when viewed from the motor output shaft external end.

The power amplifier 42 contains six field effect transistors (FET) for higher current drive to the brushless motor 6. The inputs are selected for the proper state of the voltage. The output signals from the FETs will be pulsing at the PWM 48 frequency. When brushless motor controller 40 signals the power amplifier 42 to brake in the OFF or PARK mode, the brushless motor controller 40 essentially short circuits the three windings of the brushless motor 6, resulting in a known mode of dynamic braking of brushless motor 6. The power amplifier 42 is encased in a metal housing 42A with a high degree of thermal conductivity. The power amplifier 42 is mounted directly to the wiper control and drive component aluminum housing 42B in a heat sinking relationship to dissipate heat from the large current that the power amplifier 42 must handle.

PARK SWITCH CIRCUIT 54

The non-arcing PARK switch 54 ensures that the brushless motor 6 runs the wiper arm 11 and wiper blade 13 to an exactly defined PARK position. Referring back to FIG. 1 and FIG. 6, in the preferred embodiment a magnetic trigger 70, mounted on the wiper blade drive shaft 9 to actuate a Hall Effect sensor 8 when in close proximity. The location of the PARK position can be set by adjusting the magnetic trigger 70 relative to the Hall Effect sensor 8. No mechanical interaction, no moving parts, reduced cost, no electrical arcing and increased operating temperature range are the primary benefits of the present PARK switch circuit 54. When the arm and blade are in the PARK position, the tip of the magnetic trigger (south pole), will activate the Hall Effect sensor 8, and the active low signal (PARKSW), is fed into the EPLD 38 on line 84A (FIG. 6). With the selection arm 24 contacting PARK contact A1, the EPLD 38 will sense the low signal and stop the wiper arm 11 and wiper blade 13 in the PARK position with the brushless motor 6 in braking condition. The PARK signal is ignored in the LOW or HIGH modes. The INTERMITTENT mode uses the PARK signal to start the seven second timer 84 and signal the motor controller 40 to provide two complete wiper strokes. When the wiper arm 11 returns to the PARK position the timer 84 is again started and the INTERMITTENT wiper sequence is repeated (driving the wiper blade one cycle) at seven second intervals.

BRUSHLESS MOTOR 6

The DC motor of the present invention is preferably a brushless DC motor rated for 32 oz-in of torque at 6000 RPM (0.19 HP). The three Hall Effect sensors 44A, 44B and 44C are positioned at 120 electrical degree increments around the brushless motor stator. When the brushless motor 6 rotates the Hall Effect sensors 44A, 44B and 44C transmit a series of pulses to the brushless motor controller 40, which then decodes the sensor signals and determines wiper arm 11 position as described above in the motor controller description.

Disposed within brushless motor 6 are the motor windings, and in thermal communication therein is a temperature sensor 56 rated at a predetermined temperature, preferably 130 degrees C. When the motor windings reach this predetermined temperature under a load such as during locked rotor or extended periods of operation on dry glass, thermal switch 56 opens and a temperature comparator 58 amplifies the open signal, and inputs the amplified signal to the motor controller 40 thus allowing the brushless motor 6 to coast to a stop. The temperature of the motor windings is sensed and an output temperature signal is monitored by the EPLD 38. This signal will enable signal from line 88 of the EPLD 38 to remain at a digital low, until the motor winding temperature is reduced to a level below the predetermined temperature. When the motor winding temperature, TEMPLIM, returns to a digital high, following cool down, the EPLD 38 line 88 goes high, allowing the brushless motor 6 to resume operation.

Figure 7:
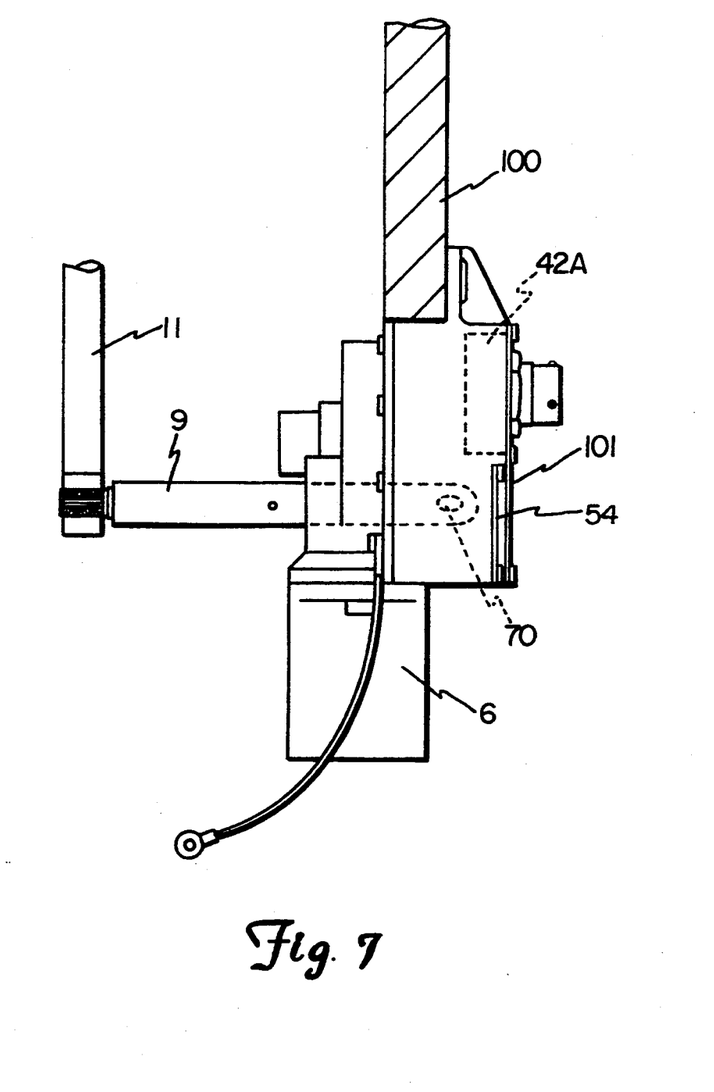
FIG. 7 is a schematic representation of a motor gear drive assembly with the electronics in heat sink relationship thereto.

In FIG. 7 the mounting of the electronic and, in particular, the power amplifier to the standard aluminum wiper drive housing 42B is shown. The drive housing 42B is fixed to an aircraft. The housing is a conventional housing and mounts the wiper shaft 9 and motor 6 are shown. The aluminum housing 42B mounts the power amplifier 42 with the metal cover 42A in heat conducting relationship to the housing. Other electronic component supports 101 are also mounted to housing 42B. The housing 42B is in heat conducting relationship to the aircraft frame, so heat dissipation from the electronics is adequate without fins and exterior heat sink metal which adds weight.

The reversal of the wipers in their cycle is accomplished by a conventional crank drive arrangement from the rotating gear of the gear drive set driven by motor 6. A worm is driven by the motor shaft and the worm gear carries a crank pin to give the needed back and forth strokes.

Although the present invention has been described with referenced to preferred embodiments, workers skilled in the art will recognize that changes may be made in form and detail without departing from the spirit and scope of the invention.

What is claimed is:

1. A multifunction aircraft windscreen wiper control system comprising:
   manually operated switch means having a multiple position switch providing at least HIGH, LOW, OFF and PARK positions;
   voltage control means responsive to each of said positions for providing an analog input voltage at a different level dependent upon the respective positions;
   logic means for providing digital control signals in response to the analog input voltage;
   a brushless motor coupled to a shaft for driving an aircraft windshield wiper and responsive to the control signals, said control signals including a run signal for energizing the motor to run and a signal providing a motor brake activation;
   means for determining the position of the motor rotor and for providing a motor direction signal as a function of motor position, the means for determining position providing a plurality of groups of output pulses in a pulse train indicative of position;
   speed control means for controlling speed of the motor; and
   gating means for selectively gating one of the plurality of groups of pulses in the pulse train, the speed control means controlling the speed of the motor based on ungated pulses in the pulse train.

2. The system of claim 1 wherein the switch means comprises a rotating shaft moving a switch arm in a voltage divider resistance network to provide different voltage output to the voltage control means at each of the positions.

3. The system of claim 2 wherein the manually operated switch means include the voltage divider resistance network packaged as a unit and fitted into a switch housing forming part of an existing aircraft windscreen wiper control system.

4. The system of claim 1 and current sensing means to provide an overcurrent signal to the logic means to disable the motor drive when the current exceeds a preselected level.

5. The system of claim 1 and a housing for the motor mounted to the aircraft frame, an amplifier for driving the motor, the amplifier having a metal casing in heat conducting relation to the housing.

6. A windscreen wiper controller for selecting a wiper function comprising:
   a wiper function switch, having an input electrical potential and a selectable analog electrical output potential having a level indicative of a desired wiper function the selectable level being variable to indicate the desired one of a plurality of wiper functions;
   logic means for receiving the analog electrical output potential and providing a digital output signal indicative of the desired wiper function;
   amplifier means for providing a power signal in response to the digital output signal;
   wiper driving means for cycling an output shaft in periodic arcuate motion in response to the power signal;
   a wiper arm coupled to an end of the output shaft opposite the wiper driving means;
   a magnet attached to the output shaft; and
   magnetic field sensing means for detecting the presence of the magnetic field associated with the magnet and providing an input to the logic means indicative of the position of the output shaft.

7. The windscreen wiper controller of claim 6 wherein the logic means comprises an array of comparators and a programmable logic device for receiving and converting the analog electrical output potential to the digital output signal.

8. The windscreen wiper controller of claim 6 wherein the wiper function switch is a rotary switch and further comprises:
   a rotating member;
   a selection arm connected to the rotating member;
   a voltage ladder constructed of a plurality of equivalent impedance electrical elements; and
   a plurality of electrical contacts that establish electrical communication with the selection arm when the rotating arm is rotated, each electrical contact connected to a selection of the voltage ladder between the impedance electrical elements of the voltage ladder, wherein the electrical signal thus established comprises the analog electrical output potential.

9. The windscreen wiper controller of claim 8 wherein the wiper function comprises:
   a LOW wiper speed selection;
   an INTERMITTENT wiper selection;
   a HIGH wiper speed selection;
   a wiper OFF selection wherein brake means for slowing the brushless electric motor is applied; and
   a momentary PARK wipers selection, wherein the rotary switch is biased to automatically return to the OFF selection following the PARK selection.

10. The windscreen wiper controller of claim 6 wherein the magnetic field sensing means is a Hall Effect sensor which provides a digital input signal to the logic means.

11. A windscreen wiper controller for selecting a wiper function comprising:
   a three-wire rotary selection switch for providing an analog wiper function signal having an analog signal level indicative of a desired wiper function;
   a comparator array for converting the analog wiper function signal to a digital wiper function signal based on the analog signal level;
   a programmable erasable logic device for receiving the digital wiper function signal and providing a logic signal;
   a brushless electric motor responding to the driver signal by generating rotating motion within the motor and
   a motor-converter connected to the brushless electric motor for converting the rotating motion of the motor to a periodic arcuate motion output.

12. The windscreen wiper controller of claim 11 wherein the motor-converter arcuate motion output is relayed through an output shaft, the output shaft comprising:
   a dipole magnet fixed to a portion of the shaft; and
   a Hall Effect sensor attached to the motor-converter proximate the shaft for accurately sensing the location of the dipole magnet.

* * * * *